United States Patent
Choi

(10) Patent No.: US 8,917,359 B2
(45) Date of Patent: Dec. 23, 2014

(54) POWER SUPPLY FOR TELEVISION AND TELEVISION INCLUDING THE SAME

(75) Inventor: Young-deok Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 367 days.

(21) Appl. No.: 12/889,051

(22) Filed: Sep. 23, 2010

(65) Prior Publication Data

US 2011/0075046 A1   Mar. 31, 2011

(30) Foreign Application Priority Data

Sep. 30, 2009  (KR) .................. 10-2009-0093305

(51) Int. Cl.
| | | |
|---|---|---|
| *H04N 5/63* | (2006.01) | |
| *H01R 12/50* | (2011.01) | |
| *H01R 24/76* | (2011.01) | |
| *H01R 12/70* | (2011.01) | |
| *H04N 5/64* | (2006.01) | |
| *H01R 103/00* | (2006.01) | |

(52) U.S. Cl.
CPC .............. *H04N 5/63* (2013.01); *H01R 12/7023* (2013.01); *H04N 5/64* (2013.01); *H01R 2103/00* (2013.01); *H01R 23/7073* (2013.01); *H01R 24/76* (2013.01); *H01R 12/707* (2013.01)
USPC ................. 348/730; 439/63; 439/79; 439/82; 439/500

(58) Field of Classification Search
USPC ........ 348/730, E5.127, E5.133; 361/785–789
See application file for complete search history.

(56) References Cited

U.S. PATENT DOCUMENTS

| | | | | |
|---|---|---|---|---|
| 5,836,676 | A | * | 11/1998 | Ando et al. .................. 362/244 |
| 6,031,726 | A | * | 2/2000 | Vinciarelli et al. ........... 361/761 |
| 6,159,023 | A | | 12/2000 | Lai |
| 6,293,818 | B1 | | 9/2001 | Kim et al. |
| 6,322,395 | B1 | | 11/2001 | Nishio et al. |
| 6,638,106 | B1 | | 10/2003 | Wu |
| 6,793,507 | B2 | | 9/2004 | Sandoval et al. |
| 6,860,765 | B1 | | 3/2005 | Spink, Jr. |

(Continued)

FOREIGN PATENT DOCUMENTS

| | | |
|---|---|---|
| DE | 20309812 U1 | 12/2003 |
| DE | 102005040241 A1 | 3/2007 |

(Continued)

OTHER PUBLICATIONS

Non-Final Office Action dated Feb. 20, 2014 issued by the U.S. Patent Office in counterpart U.S. Appl. No. 13/867,598.

(Continued)

*Primary Examiner* — Jefferey Harold
*Assistant Examiner* — Humam Satti
(74) *Attorney, Agent, or Firm* — Sughrue Mion, PLLC

(57) ABSTRACT

A power supply for a television and a television including the same, the power supply including: a rectifier which rectifies input AC power; a converter which converts the rectified power into DC power through a switching control; a circuit board on which at least one of the rectifier and the converter is mounted; and an input connector which receives the AC power and is mounted on the circuit board such that a projecting height of the input connector projecting from the circuit board is substantially equal to or smaller than a projecting height of at least one of the rectifier and the converter.

31 Claims, 13 Drawing Sheets

(56) References Cited

U.S. PATENT DOCUMENTS

| | | | |
|---|---|---|---|
| 7,121,899 B2* | 10/2006 | Homann et al. | 439/680 |
| 7,182,610 B2* | 2/2007 | Lin | 439/79 |
| 7,453,528 B2* | 11/2008 | Kim et al. | 349/1 |
| 2002/0019154 A1 | 2/2002 | Na | |
| 2003/0207613 A1 | 11/2003 | Chen | |
| 2005/0206801 A1 | 9/2005 | Miura | |
| 2005/0237010 A1 | 10/2005 | Ying et al. | |
| 2006/0160382 A1* | 7/2006 | Nishida et al. | 439/76.1 |
| 2006/0256595 A1* | 11/2006 | Lanni | 363/80 |
| 2006/0286843 A1* | 12/2006 | Fukazawa | 439/260 |
| 2007/0153454 A1* | 7/2007 | Chang et al. | 361/681 |
| 2007/0254502 A1 | 11/2007 | Horikuri | |
| 2008/0057752 A1 | 3/2008 | Horikiri | |
| 2008/0068517 A1* | 3/2008 | Urisu | 348/790 |
| 2008/0096409 A1 | 4/2008 | Cheng | |
| 2008/0102691 A1 | 5/2008 | Darr | |
| 2008/0248680 A1 | 10/2008 | Stoner et al. | |
| 2008/0297462 A1 | 12/2008 | Hsiung | |
| 2009/0257210 A1* | 10/2009 | Yamamura et al. | 361/775 |
| 2010/0019696 A1* | 1/2010 | Kimura | 315/297 |
| 2010/0238372 A1* | 9/2010 | Hiradate et al. | 349/58 |
| 2010/0321369 A1 | 12/2010 | Cho | |

FOREIGN PATENT DOCUMENTS

| | | |
|---|---|---|
| EP | 0840408 A2 | 5/1998 |
| EP | 840408 A2 * | 5/1998 |
| EP | 1492219 A2 | 12/2004 |
| EP | 1903549 A2 | 3/2008 |
| KR | 20-0316854 Y1 | 6/2003 |
| KR | 1020090057623 A | 6/2009 |
| WO | 2009-104508 A1 | 8/2009 |
| WO | 2009-107010 A2 | 9/2009 |

OTHER PUBLICATIONS

USPTO Office Action dated Aug. 4, 2014 issued in co-pending U.S. Appl. No. 14/252,442.

* cited by examiner

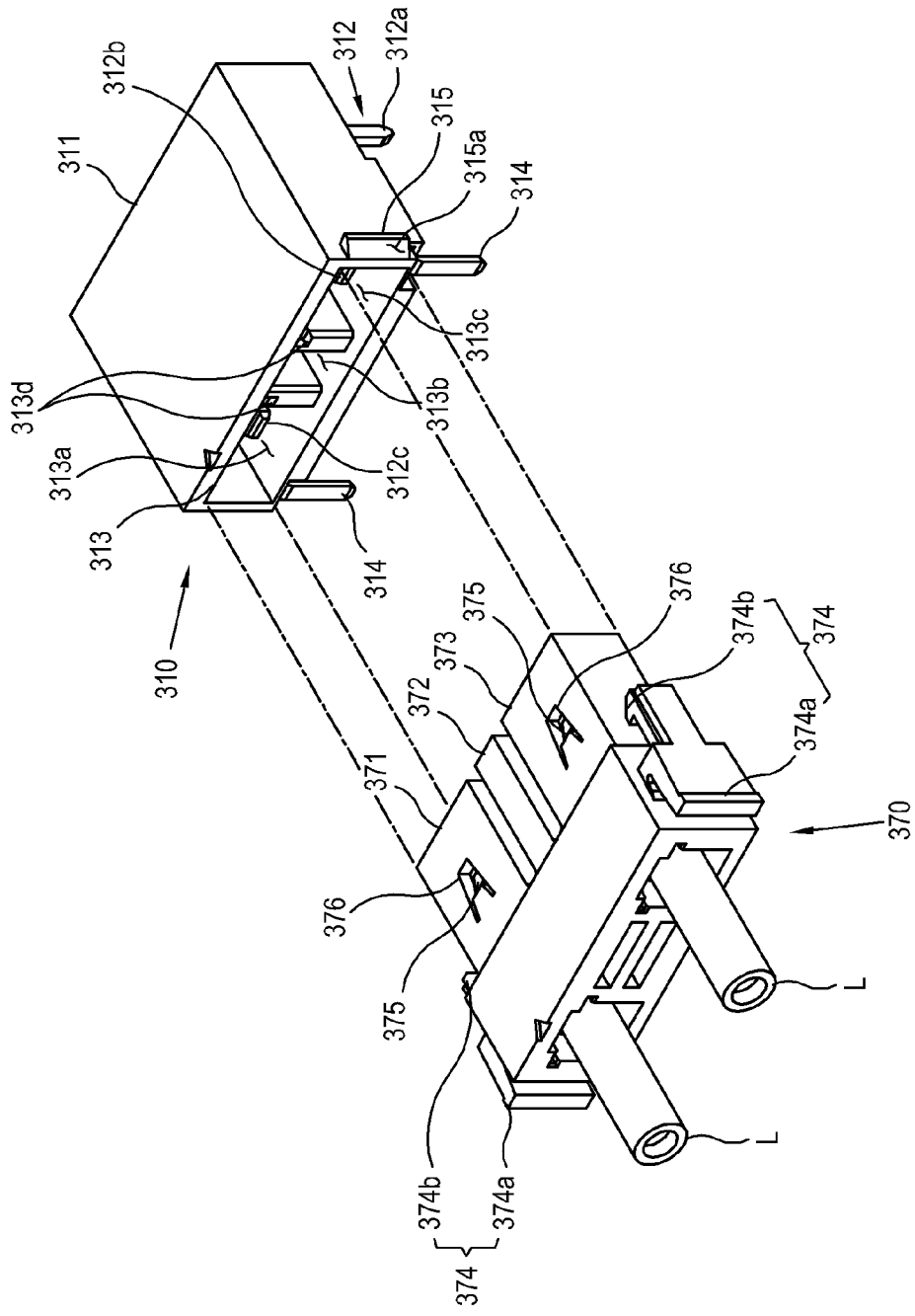

POWER SUPPLY FOR TELEVISION AND TELEVISION INCLUDING THE SAME

CROSS-REFERENCE TO RELATED APPLICATIONS

This application claims priority from Korean Patent Application No. 10-2009-0093305, filed on Sep. 30, 2009 in the Korean Intellectual Property Office, the disclosure of which is incorporated herein by reference.

BACKGROUND

1. Field

Devices consistent with the inventive concept relate to a power supply for television and a television including the same, and more particularly, to a power supply for a television, which is capable of miniaturization of televisions, and a television including the same.

2. Description of the Related Art

A television is an apparatus which receives and processes broadcasting signals and displays images. In recent years, thin televisions with a reduced thickness have been developed.

Such a television has a power supply which converts commercial AC power to supply predetermined power to various kinds of electronic parts within the television. However, thin televisions require the design of thin power supply, and therefore there is a need for such a thin power supply.

SUMMARY

Accordingly, it is an aspect of the exemplary embodiments to provide a power supply for a thin television and a television including the same. Another aspect of the exemplary embodiments is to provide a power supply for a television with improved use convenience and a television including the same.

Additional aspects of the exemplary embodiments will be set forth in part in the description which follows and, in part, will be obvious from the description, or may be learned by practice of the inventive concept.

According to an aspect of an exemplary embodiment, there is provided a power supply for a television, the power supply including: a rectifier which rectifies input AC power; a converter which converts the rectified power into DC power through a switching control; a circuit board on which at least one of the rectifier and the converter is mounted; and an input connector which receives the AC power from an external source and is mounted on the circuit board such that a projecting height of the input connector projecting from the circuit board is substantially equal to or smaller than a projecting height of at least one of the rectifier and the converter.

The input connector may be mounted to the circuit board along a direction substantially perpendicular to the circuit board.

The input connector may include an input terminal which receives the AC power, having one end portion which is accommodated in the input connector and another end portion which is mounted on the circuit board for receiving the AC power.

The input connector may further include a shield which prevents the input terminal from being exposed in an upper direction of the circuit board.

The input connector may further include a coupling pin which projects toward the circuit board and couples the input connector to the circuit board.

The circuit board may include a connector accommodating hole which accommodates the input connector.

The input connector may include a hook which is hooked to a hoop of the connector accommodating hole of the circuit board.

The input connector may further include arms extending in a plane direction of the circuit board.

The arms may be respectively formed at both sides of the input connector with the connector accommodating hole interposed between the arms.

The input connector may further include: a fastening hole which is formed in at least one of the arms to fasten the input connector to the circuit board by a fastener; and a coupling pin which is formed in at least one of the arms, projects toward the circuit board and is coupled to the circuit board by welding.

The circuit board may further include an element accommodating hole which accommodates at least one of electronic elements constituting the rectifier and the converter.

According to an aspect of another exemplary embodiment, there is provided a television including: an image receiving unit which receives an image signal; an image processing unit which processes the received image signal; a display panel which displays the processed image signal; a backlight unit which irradiates the display panel with light; a power supply according to any one of the aspects, which supplies power to at least one of the image receiving unit, the image processing unit and the backlight unit; and an output connector which is coupled to the input connector of the power supply for inputting AC power to the power supply.

The television may further includes: a front cover which covers a front side of the television in such a manner that the display panel is exposed; and a rear cover which is opposed to the front cover, accommodates the image receiving unit, the image processing unit, the backlight unit and the power supply, and includes a depressed portion depressed toward the front cover.

The rear cover may include a cover insertion hole formed at one side of the depressed portion, and the power supply may be accommodated in the rear cover in such a manner that the input connector is coupled to the output connector through the cover insertion hole.

According to an aspect of the exemplary embodiments, it is possible to provide a power supply for a thin television and a television including the same. According to another aspect of the exemplary embodiments, it is possible to provide a power supply for a television with improved use convenience and a television including the same.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 5 is a schematic perspective view of an input connector of a power supply and an output connector coupled to the input connector according to a second exemplary embodiment;

DETAILED DESCRIPTION OF EXEMPLARY EMBODIMENTS

Figure 1:
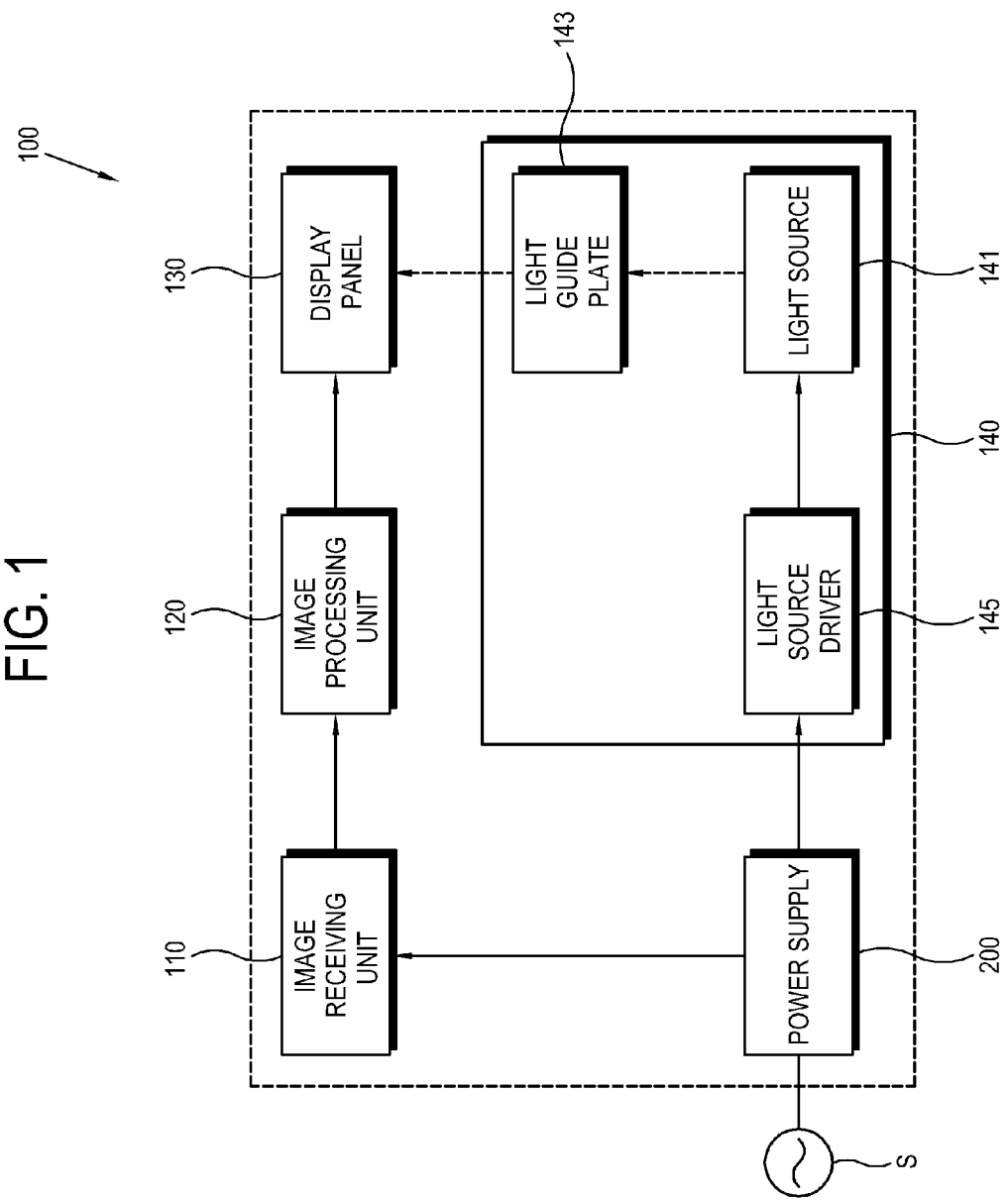
FIG. 1 is a schematic block diagram of a television according to a first exemplary embodiment.

Reference will now be made in detail to the exemplary embodiments, examples of which are illustrated in the accompanying drawings, so that those in the art can easily practice the exemplary embodiments. The present inventive concept is not limited to exemplary embodiments disclosed herein but may be implemented in different forms.

In the following exemplary embodiments, for the purpose of clarity, the same components are denoted by the same reference numerals throughout the drawings, and explanation thereof will be representatively given in a first exemplary embodiment but will be omitted in other embodiments. Expressions such as "at least one of," when preceding a list of elements, modify the entire list of elements and do not modify the individual elements of the list.

FIG. 1 is a schematic block diagram of a television 100 according to a first exemplary embodiment. As shown in FIG. 1, the television 100 includes an image receiving unit 110 which receives an image (e.g., an image signal), an image processing unit 120 which processes the received image, a display panel 130 which displays the processed image, a backlight 140 which illuminates the display panel 130 with light, and a power supply 200 which supplies power to the above components 110, 120, 130, and 140.

The image receiving unit 110 may include a broadcasting tuner which receives radio frequency (RF) signals from an external source by a wireless or wired connection. In some cases, the image receiving unit 110 may receive image signals in compliance with composite video, component video, super video, high definition multimedia interface (HDMI) standards and the like.

The image processing unit 120 processes the image signal transmitted from the image receiving unit 110 according to various preset image processes. Examples of the image processing processes performed by the image processing unit 120 may include decoding and/or encoding, de-interlacing, frame refresh rate conversion, scaling, noise reduction for improved image quality, detail enhancement, and so on. Of course, the above image processing is merely an example, and may be modified or improved in various manners. The image processing unit 120 may be a combination of individual elements which perform the above-described image processes independently, or alternatively may be an integrated type incorporating the above-described image processes.

The display panel 130 may include a liquid crystal panel. The liquid crystal panel includes a liquid crystal layer (not shown) interposed between two substrates (not shown) and displays an image by adjusting orientation of liquid crystal molecules in the liquid crystal layer. However, it is understood that the display panel 130 is not limited to a liquid crystal panel in another exemplary embodiment. For example, the display panel 130 may be a plasma display, an organic light emitting diode (OLED) display, or any flat panel display or the like.

The backlight unit 140 includes: a light guide plate 143 having an incidence surface into which light is incident, and an emitting surface through which the light is emitted to the display panel 130; a light source 141 which emits the light toward the incidence surface of the light guide plate 143; optical sheets (not shown) which adjust characteristics of the light emitted through the emitting surface of the light guide plate 143; and a light source driver 145 which drives the light source 141.

The light source 141 may include, for example, at least one of light emitting diodes (LEDs) and cold cathode fluorescent lamps (CCFLs). Furthermore, the light source 141 may include red, green and blue LEDs or may implement white light by mixing red, green and blue light emitted from the respective color LEDs. The light source 141 may be arranged according to an edge type where the light source is arranged along an edge of the display panel 130, a direct type where the light source is arranged in a rear side of the display panel 130, or a hybrid type which is a combination of the edge type and the direct type. The light source driver 145 controls a switching ON/OFF of the light source 141.

The power supply 200 receives commercial AC power S and converts the received AC power S into power used by at least one of the above-described image receiving unit 110, image processing unit 120, display panel 130, and backlight unit 140.

Figure 2:
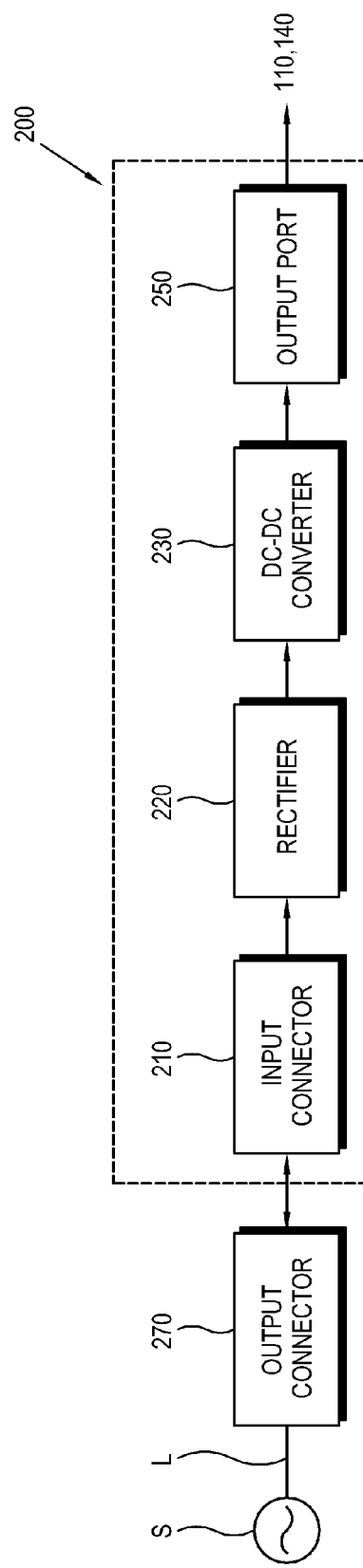
FIG. 2 is a schematic block diagram of a power supply of FIG. 1.
Figure 3:
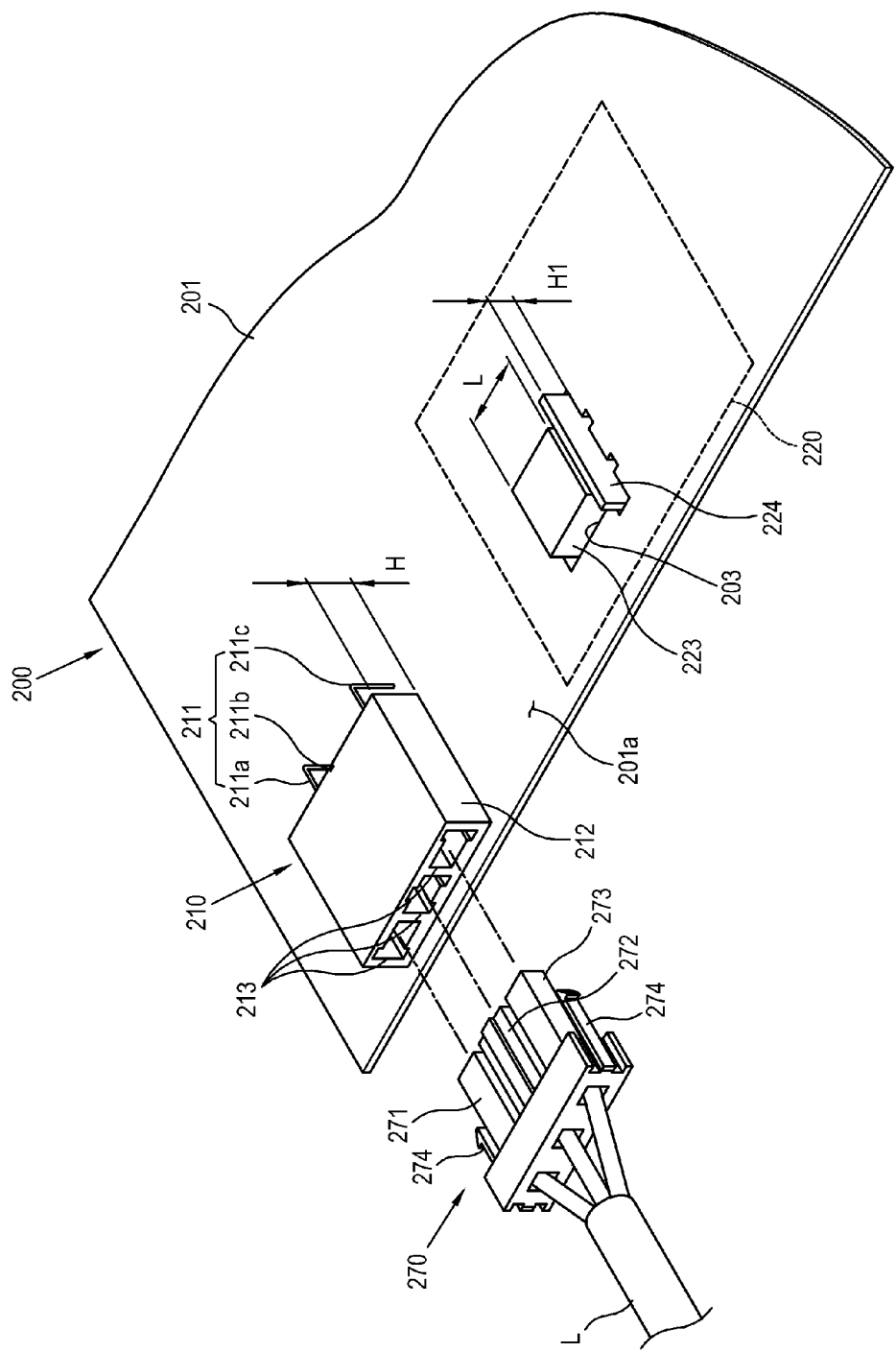
FIG. 3 is a perspective view of main parts of the power supply of FIG. 2.
Figure 4A:
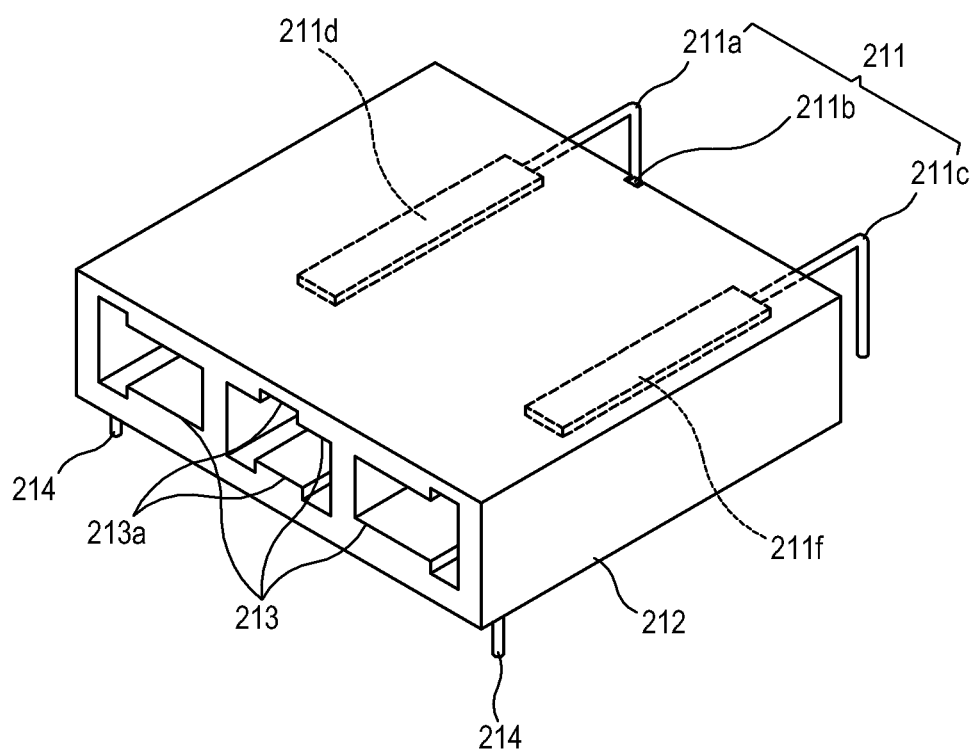
FIGS. 4A to 4C are a schematic perspective view, a schematic side view and a schematic front view of an input connector of the power supply of FIG. 2, respectively.
Figure 4B:
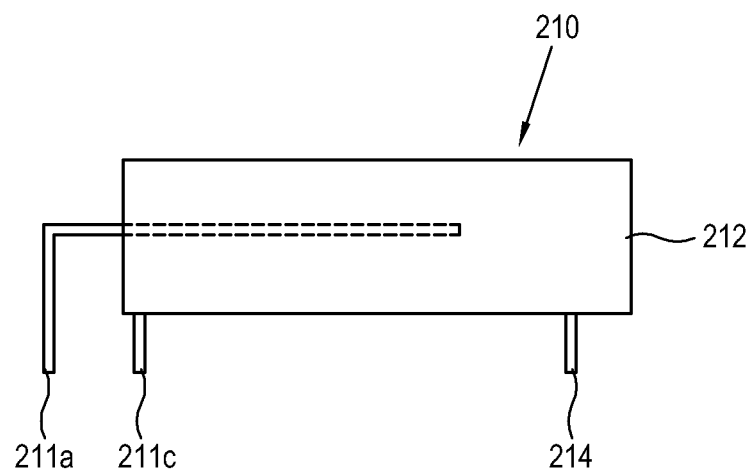
Figure 4C:
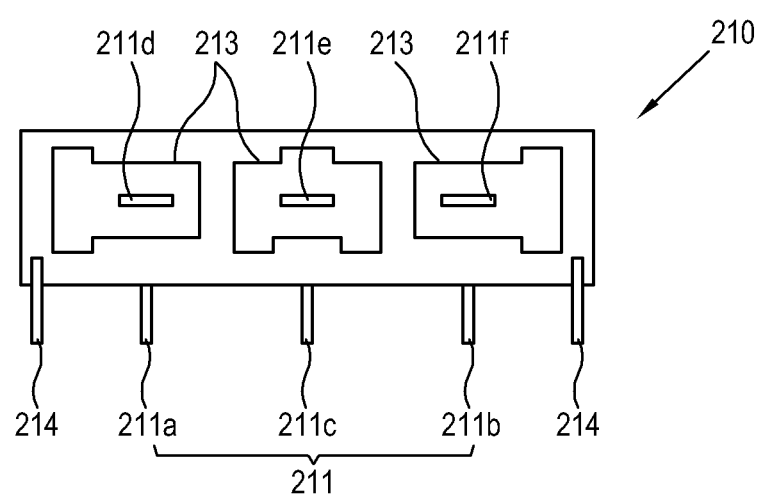

As shown in FIGS. 2 and 3, the power supply 200 may include: a circuit board 201; an input connector 210 which is provided on the circuit board 201 to receive the commercial AC power S; a rectifier 220 which rectifies the input AC power; a DC-DC converter 230 which converts a DC output from the rectifier 220 into DC power used by one or more of the components 110, 120, 130 and 140 in the television 100; and an output port 250 through which the DC power from the DC-DC converter 230 is output.

The output port 250 may be provided to output the DC power from the DC-DC converter 230 to at least one of the image receiving unit 110, image processing unit 120, display panel 130, and/or backlight unit 140. The output port 250 may also be detachably connected to power input connectors (not shown) provided in the components 110, 120, 130 and 140. In some cases, the output port 250 may be omitted.

In this exemplary embodiment, the power supply 200 may further include an output connector 270 which is detachably coupled to the input connector 210. The output connector 270 may be formed at one end portion of a cord L connected to the commercial AC power S in correspondence with the input connector 210. In some cases, however, the output connector 270 and the input connector 210 may be formed on a non-correspondence basis. To this end, a transducer (not shown) which enables input and/or output of signals having different formats (so-called "gender") may be interposed between the output connector 270 and the input connector 210.

Moreover, in this exemplary embodiment, an electric outlet (not shown) connecting to the commercial AC power S may be formed at the other end portion of the cord L. The electric outlet (not shown) may be modified in various ways in consideration of different national standards.

The rectifier 220 may include rectifying diodes (not shown) which rectify the AC power into the DC power. The rectifier 220 may further include a smoothing part (not shown) which smoothes the DC power.

The DC-DC converter 230 may include a transformer (not shown) and a power switching element (not shown) which switches the transformer (not shown).

In this exemplary embodiment, all of the input connector 210, rectifier 220, DC-DC converter 230 and output port 250 may be arranged on a single circuit board.

FIG. 3 is a main part perspective view of the input connector 210 and electronic elements 223 constituting the rectifier 220 in the power supply 200 according to an exemplary embodiment. As shown in FIG. 3, the input connector 210 may be arranged on the circuit board 201 in such a manner that a height H of the input connector 210 projecting from a top surface 201a of the circuit board 201 is substantially equal to or less than a projecting height of at least one of the rectifier 220 and the DC-DC converter 230.

In this exemplary embodiment, the projecting height of the rectifier 220 and the DC-DC converter 230 refers to a greatest height of respective electronic elements constituting the rectifier 220 and the DC-DC converter 230, which projects from the top surface 201a of the circuit board 201.

Here, the phase "substantially equal to" means that the projecting height H of the input connector 210 is equal to the projecting height of the rectifier 220 and/or the DC-DC converter 230 within a predetermined range. In this exemplary embodiment, the predetermined range may be about 5 mm. For example, even if the projecting height H is greater than the projecting height of the rectifier 220 and the DC-DC converter 230 by about 5 mm, it can be considered that the input connector 210, the rectifier 220 and the DC-DC converter 230 have substantially the same height.

In this exemplary embodiment, at least one of the electronic elements 223 (for example, a capacitor and so on) constituting the rectifier 220 may be received in an element receiving hole 203 formed in the circuit board 201. If the at least one electronic element 223 is provided on the circuit board 201 in a typical manner, its projecting height H1 will correspond to a body height which is greater than the projecting height H1, as shown in FIG. 3.

However, in the power supply 200 of this exemplary embodiment, the electronic element 223 may lay flat such that a lead of the electronic element 223 travels in parallel to the top surface 201a of the circuit board 201. In addition, the electronic element 223 may be formed on a separate element board 224 to support the electronic element 223 stably, with the element board 224 communicably connected to the circuit board 201.

This allows the projecting height H1 of the electronic element 223 from the top surface 201a of the circuit board 201 to be reduced, which may result in a thinner power supply 200. In this exemplary embodiment, the electronic element 223 is merely one example of elements constituting the rectifier 220, but it should be understood that other electronic elements constituting the power supply 200 may be provided on the circuit board 201.

As shown in FIGS. 3 and 4A to 4C, the input connector 210 includes: a connector casing 212; a plurality of insertion holes 213 formed in the connector casing 212; and a plurality of input terminals 211 including respective one end portions 211d, 211e and 211f accommodated in the plurality of insertion holes 213 of the connector casing 212 and respective other end portions 211a, 211c and 211b exposed out of the connector casing 212 to be connected to the circuit board 201. The other end portions 211a, 211c and 211b of the plurality of input terminals 211 may be soldered to the circuit board 201. In this exemplary embodiment, the other end portions 211a, 211c and 211c may be formed to be bent toward the circuit board 201.

A mis-insertion preventing portion 213a which prevents the output connector 270 from being inserted erroneously may be formed in at least one of the plurality of insertion holes 213.

In addition, the input connector 210 may be supported to the circuit board 201 by a solder bond between the other end portions 211a, 211c and 211b of the input terminals 211 and the circuit board 210. For example, if an attachment/detachment cycle of the input/output connectors 210 and 270 is relatively long (for example, if the input/output connectors 210 and 270 are designed to be attached/detached by a serviceman other than a common user), the input connector 210 may be fixed to the circuit board 201 by the input terminal 211 without using a separate coupling pin which will be described later.

The input terminals 211 may include a (+) electrode terminal 211a which receives (+) power from the commercial AC power S, a ground terminal 211c for ground, and a (−) electrode terminal 211b which receives (−) power of the commercial AC power S.

The output connector 270 includes a plurality of projecting insertion portions 271, 272 and 273 which are adapted to be respectively inserted in the plurality of insertion holes 213 of the input connector 210. The plurality of projecting insertion portions 271, 272 and 273 may be formed to correspond to the plurality of insertion holes 213 of the input connector 210. If they do not correspond to each other, the plurality of projecting insertion portions 271, 272 and 273 and the plurality of insertion holes 213 can be communicably connected with each other through the above-mentioned transducer (not shown) (so-called "gender") interposed between the output connector 270 and the input connector 210.

Output terminals (not shown) through which the (+) power and (−) power of the commercial AC power S are output are formed in the plurality of projecting insertion portions 271 and 273. The projecting insertion portion 272 may be formed as a ground terminal for ground.

The output connector 270 may include a pair of hooks 274 with the plurality of projecting insertion portions 271, 272 and 273 interposed therebetween. The pair of hooks 274 is inserted in the plurality of insertion holes 213 of the input connector 210 and engages with corresponding hitches (not shown) formed in the insertion holes 213. Accordingly, the input/output connectors 210 and 270 are joined to each other to allow the commercial AC power S to be delivered to the power supply 200. When end portions of the hooks 274 are pressed down and pulled, the hooks 274 are released from the hitches (not shown) to allow the output connector 270 to be removed from the input connector 210.

The input connector 210 further includes coupling pins 214 provided on the connector casing 212. In this exemplary embodiment, the connector casing 212 may be made of a plastic material and the coupling pins 214 may be made of a metal material, though it is understood that all embodiments are not limited thereto. The input connector 210 may be integrated with the coupling pins 214 by insert molding. The coupling pins 214 project toward the circuit board 201 to couple the input connector 210 to the circuit board 201. The coupling pins 214 may be coupled to the circuit board 201 by soldering.

Figure 6:
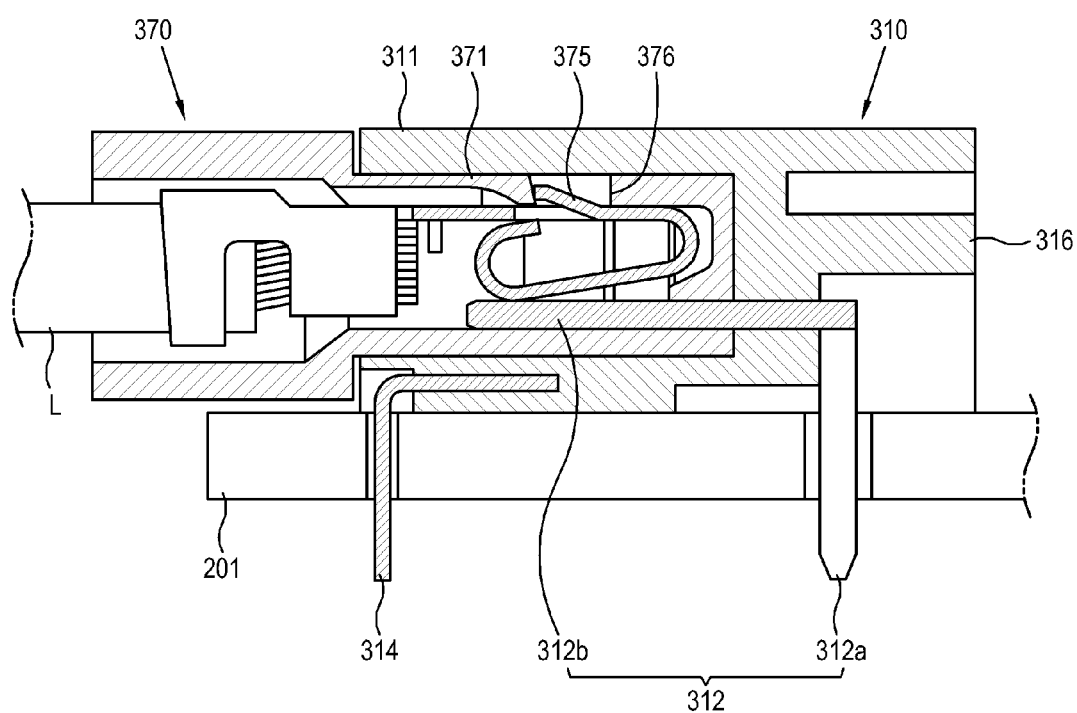
FIG. 6 is a schematic sectional view showing connection of the input connector and the output connector of FIG. 5.

A power supply according to a second exemplary embodiment includes an input connector 310 as shown in FIGS. 5 and 6. A television according to the second exemplary embodiment includes: the power supply of the second exemplary embodiment; and an output connector 370 which supplies commercial AC power to the input connector 310. Other components in this embodiment have the same configuration and operation as those in the first exemplary embodiment, and therefore, explanations thereof will not be repeated. In this exemplary embodiment, the input connector 310 has two input terminals 312, while the input connector 210 described in the first exemplary embodiment has three input terminals 211.

The input connector 310 includes: a connector casing 311; an insertion hole 313 formed in the connector casing 311; and a plurality of input terminals 312 having one end portions 312c and 312b accommodated within the insertion hole 313 and other end portions 312a exposed out of the connector casing 311 to be inserted in the circuit board 201.

The other end portions 312a of the plurality of input terminals 312 may be coupled to the circuit board 201 by soldering. The input connector 310 can be supported to the circuit board 201 by soldering between the input terminals 312 an the circuit board 201.

The insertion hole 313 may be partitioned into a plurality of insertion holes 313a, 313b and 313c into which a plurality of projecting insertion portions 371, 372 and 373 of the output connector 370 is respectively inserted. The insertion hole 313 may further include a mis-insertion preventing portion 313d which prevents the output connector 370 from being inserted erroneously.

Output terminals 375 for (+) and (−) power output of the commercial AC power S are respectively formed within the projecting insertion portions 371 and 373, which are disposed at both sides of the output connector 370, of the plurality of projecting insertion portions 371, 372 and 373.

Exposure holes 376 for exposing a portion of the output terminals 375 externally may be formed at one side of the projecting insertion portions 371 an 373 at which the output terminals 375 are formed. The exposure holes 375 may be formed to direct to the top surface of the circuit board 201.

In addition, the output connector 370 may further include a plurality of hooks 374 at both sides, with the plurality of projecting insertion portions 371, 372 and 373 interposed therebetween. The input connector 310 may further include a plurality of hitches 315 provided opposite to the plurality of hooks 374.

When the output connector 370 is inserted in the input connector 310, hooking pieces 374b formed at one end portions of the hooks 374 climb over inclined surfaces 315a of the hitches 315 and engage with the hitches 315. Accordingly, the input/output connectors 310 and 370 can be stably joined to each other. On the other hand, when the output connector 370 is pulled while pressing down grippers 374a formed at the other end portions of the plurality of hitches 315, the output connector 370 can be detached from the input connector 310 as the hitches 315 are released from the hooks 374.

The input connector 310 may further include coupling pins 314 for more stably coupling the input connector 310 to the circuit board 201 in addition to the soldering of the input terminals 312 to the circuit board 201. The coupling pins 314 may be provided to project from the connector casing 311 toward the circuit board 201. The coupling pins 314 may be made of a metal material. The coupling pins 314 and the connector casing 311 may be extruded by insert molding. Furthermore, the coupling pins 314 may be inserted in and coupled to the circuit board 201 by soldering.

In addition, the input connector 310 may further include a shield 316 which prevents the input terminals 312 from being exposed in the upper direction of the circuit board 201.

FIG. 6 is a sectional view showing a state where the output connector 370 is joined to the input connector 310 according to an exemplary embodiment. As shown in FIG. 6, the output terminal 375 of the output connector 370 contacts the input terminal 312 of the input connector 310.

Figure 7:
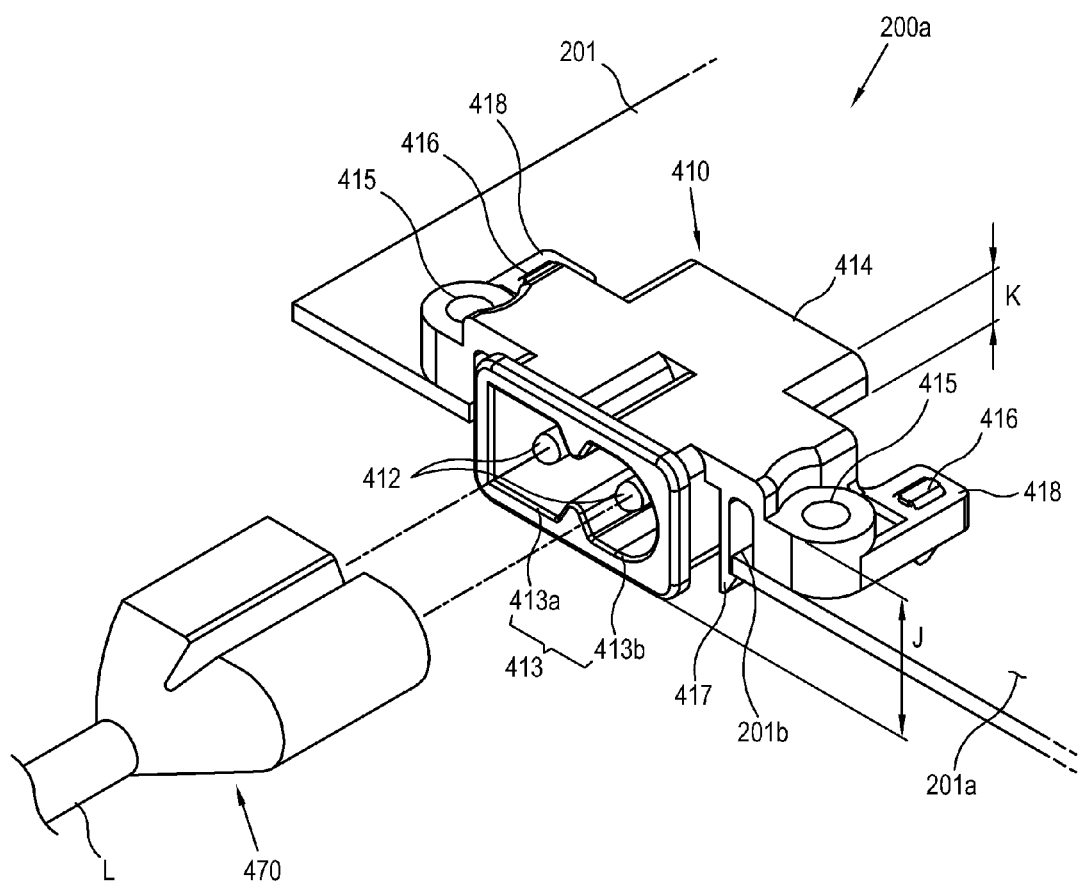
FIG. 7 is a schematic perspective view of an input connector of a power supply and an output connector coupled to the input connector according to a third exemplary embodiment.
Figure 8A:
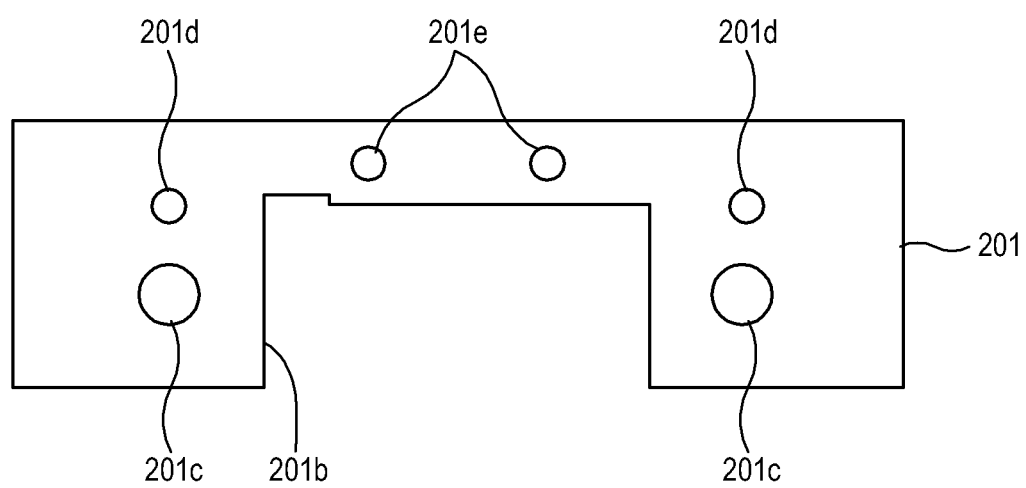
FIG. 8A is a plan view of main parts of a circuit board of FIG. 7.
Figure 8B:
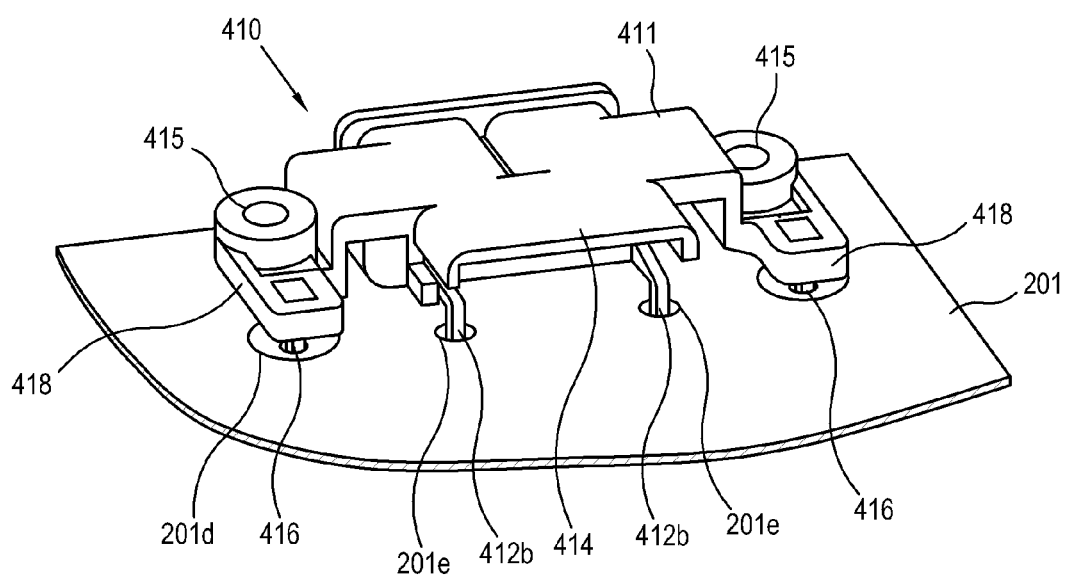
FIG. 8B is a schematic rear perspective view of an input connector of FIG. 7.

Hereinafter, a power supply 200a according to a third exemplary embodiment will be described with reference to FIGS. 7 and 8A to 8B. Referring to FIGS. 7 and 8A to 8B, an output connector 470 is formed at an end portion of a cord L connected to the commercial AC power. Only (+) and (−) power terminals without any ground terminal may be provided in the output connector 470.

In this exemplary embodiment, the power supply 200a includes an input connector 410 and a television including the power supply 200a includes the output connector 470.

The input connector 410 includes: a connector casing 411; an insertion hole 413 formed in the connector casing 411; and a plurality of input terminals 412 having one end portions accommodated in the insertion hole 413 and other end portions 412b bent toward the circuit board 201.

In this exemplary embodiment, the insertion hole 413 may include a rectangular hoop 413a with substantially right-angled edges and a circular hoop 413b. The rectangular hoop 413a serves to prevent the output connector 470 from being inserted erroneously. It is understood that the shape of the insertion hole 413 is not limited to the rectangular hoop 413a and the circular hoop 413b, and may vary in other embodiments. For example, the shape of the insertion hole 413 may be modified according to national standards.

The input connector 410 may be accommodated in a connector accommodating hole 201b of the circuit board 201. The connector accommodating hole 201b may be formed by cutting out one side of the circuit board 201. When the input connector 410 is accommodated in the circuit board 201 by a thickness (t) of the circuit board 201, a height (K) of the input connector 410 from the top surface 201a of the circuit board 201 becomes lower than a height (J) of the input connector 410 itself. This may result in a thinness of the power supply 200a.

The input connector 410 may further include board hooks 417 which can be hooked to a hoop of the connector accommodating hole 201b of the circuit board 201. The board hooks 417 prevent the input connector 410 from being upwardly separated from the circuit board 201. The board hooks 417 may be respectively formed at both sides of the connector casing 411 with the connector accommodating hole 201b interposed therebetween.

The input connector 410 may further include arms 418 extending from the connector casing 411 in the plane direction of the circuit board 201. The arms 418 may be respectively formed at both sides of the connector casing 411 with the connector accommodating hole 201b interposed therebetween.

In addition, the input connector 410 may further include coupling pins 416 which couple the connector casing 411 to the circuit board 201. In this exemplary embodiment, the coupling pins 416 may be made of a metal material and the connector casing 411 may be made of a plastic resin. The input connector 410 may be formed to be integrated with the coupling pins 416 by insert molding. The coupling pins 416 may be coupled to the circuit board 201 by soldering. This allows the input connector 410 to be more stably supported to the circuit board 201.

In addition, the input connector 410 may further include fastening holes 415 in which fasteners (not shown) which fasten the connector casing 411 to the circuit board 201 are inserted. This allows the input connector 410 to be stably coupled to the circuit board 201 even when a common user relatively frequently attaches/detaches the output connector 470 to/from the input connector 410. In this exemplary embodiment, the fastening holes 415 may be formed with the connector accommodating hole 201b interposed therebetween. The fastening holes 415 and the coupling pins 416 may be formed in the arms 418.

The input connector 410 may further include a shield 414 which prevents the input terminals 412 from being exposed in the upper direction of the circuit board 201. The shield 414 may be integrated with the connector casing 411. This eliminates a need to form a separate shield in the circuit board, which may result in improved assemble ability.

FIG. 8A is an enlarged view of main parts of the circuit board 201 on which the input connector 410 is mounted. Referring to FIG. 8A, around the connector accommodating hole 201b may be formed board fastening holes 201c corresponding to the fastening holes 415 of the input connector 410; pin holes 201d in which the coupling pins 416 are inserted; and terminal holes 201e in which the other end portions 412b of the input terminals 412 are inserted.

Figure 9:
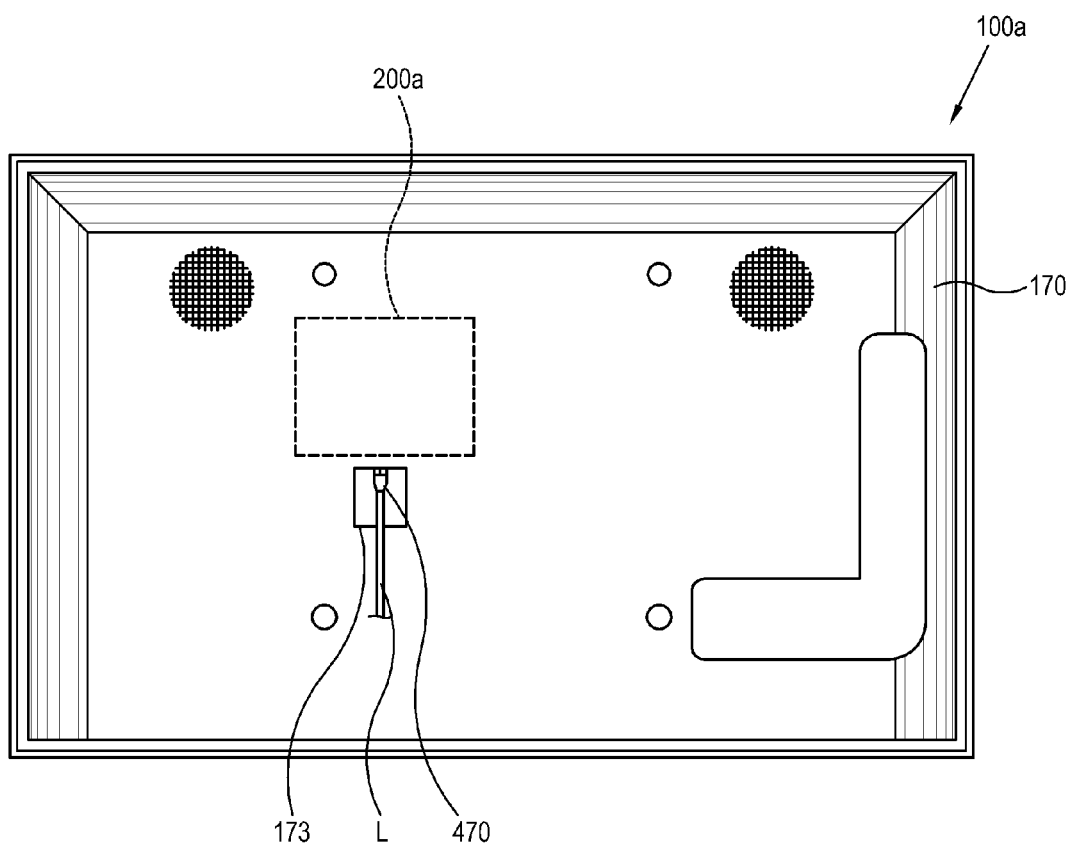
FIG. 9 is a schematic rear view of a television according to the third exemplary embodiment.
Figure 10:
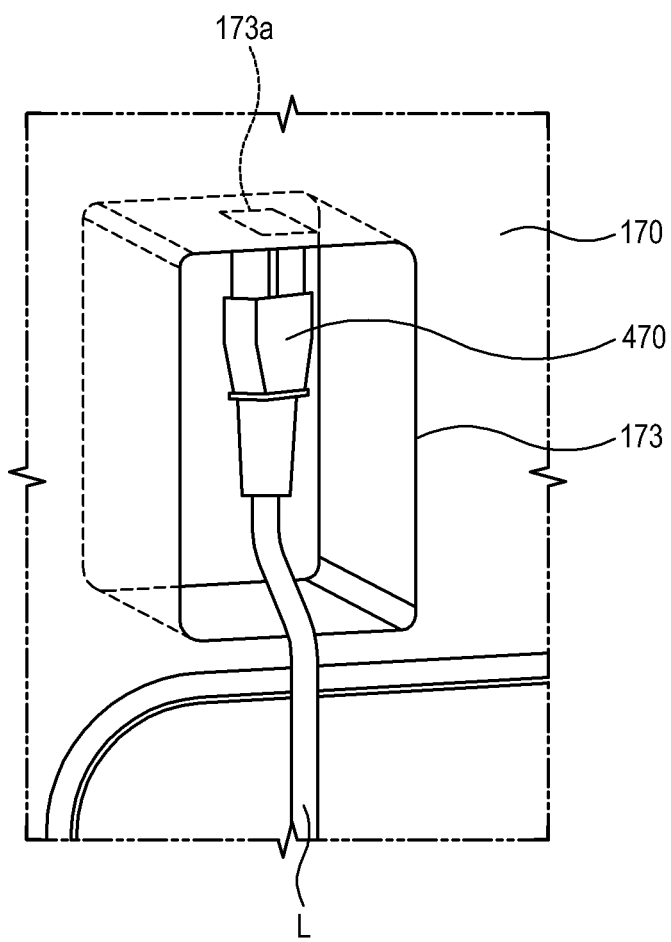
FIG. 10 is an enlarged perspective view of main parts in FIG. 9.

Hereinafter, a television 100a according to the third exemplary embodiment will be described with reference to FIGS. 9 and 10. FIG. 9 is a schematic rear view of the television 100a and FIG. 10 is an enlarged perspective view of main parts in FIG. 9. In the third exemplary embodiment, the television 100a includes the above-described power supply 200a.

The television 100a further includes a front cover (not shown); and a rear cover 170 which is detachably coupled to the front cover (not shown). Between the front cover and the rear cover 170 may be accommodated the image receiving unit (110 in FIG. 1); the image processing unit (120 in FIG. 1); the display panel (130 in FIG. 1); the backlight unit (140 in FIG. 1) (all of which have been described in the first exemplary embodiment); and the power supply 200a. The display panel 130 is accommodated in such a manner that a screen displayed on the front cover is exposed. At least one of the front cover and the rear cover 170 may be made of an aluminum material. This allows heat generated in the backlight unit 140 to be more smoothly exhausted externally.

The rear cover 170 may further include an inwardly-depressed portion 173. At one side of the depressed portion 173 may be formed a cover insertion hole 173a in which the output connector 470 is inserted.

The power supply 200a may be supported between the front cover and the rear cover 170 such that the insertion holes 413 of the input connector 410 can communicate to the cover insertion hole 173a. Accordingly, power can be supplied to the television 100a when a common user inserts the output connector 470 in the cover insertion hole 173a of the depressed portion 173.

While a so-called LCD television using a liquid crystal display panel as one example of display panels has been shown and described above, it is to be understood that the above-described input connector 210, 310, and 410 and output connector 270, 370, and 470 can be employed for other televisions using a plasma display panel (PDP), an active-matrix organic light emitting diode (AMOLED) panel, or other types of display panels.

In addition, it is to be understood that the scheme for cutting out a portion of the circuit board 201 and accommodating the connector 410 in the portion as described in the third exemplary embodiment can be equally applied to the first and second exemplary embodiments.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A power supply for a television, the power supply comprising:
   a circuit board;
   a rectifier configured to rectify input AC power and mounted on or mounted through a surface of the circuit board;
   a converter configured to convert the rectified AC power into DC power through a switching control and mounted on or mounted through the surface of the circuit board; and
   an input connector configured to receive the AC power from an external source and is mounted on the circuit board such that a projecting height of the input connector projecting from the circuit board is smaller than each of a projecting height of the rectifier and a projecting height of the converter projecting from the circuit board.

2. The power supply according to claim 1, wherein the input connector is mounted to the circuit board along a direction substantially perpendicular to the circuit board.

3. The power supply according to claim 1, wherein the input connector comprises at least one input terminal configured to receive the AC power, each of the at least one input terminal comprising one end portion which is accommodated in the input connector and another end portion which is mounted on the circuit board.

4. The power supply according to claim 3, wherein the input connector further comprises a shield configured to prevent the input terminal from being exposed in a direction away from the circuit board.

5. The power supply according to claim 3, wherein the input connector further comprises a coupling pin projecting toward the circuit board and configured to couple the input connector to the circuit board.

6. The power supply according to claim 1, wherein the input connector comprises a hook which is hooked to a hoop of the connector accommodating hole of the circuit board.

7. The power supply according to claim 1, wherein the input connector comprises arms extending in a plane direction of the circuit board.

8. The power supply according to claim 7, wherein the arms are respectively provided at both sides of the input connector with the connector accommodating hole interposed between the arms.

9. The power supply according to claim 7, wherein the input connector further comprises:
   a fastening hole which is formed in at least one of the arms to fasten the input connector to the circuit board by a fastener; and
   a coupling pin which is provided in at least one of the arms, projects toward the circuit board, and is coupled to the circuit board by welding.

10. The power supply according to claim 1, wherein the circuit board further includes an element accommodating hole configured to accommodate at least one of electronic elements constituting the rectifier and the converter.

11. The power supply according to claim 1, wherein:
    the input connector comprises at least one input terminal configured to receive the AC power through a connection to at least one corresponding output terminal of a detachable output connector coupled to the input connector to provide the AC power; and
    the input connector is configured to accommodate the output connector therein through at least one insertion hole thereof.

12. The power supply according to claim 11, wherein the at least one insertion hole of the input connector includes a first insertion hole having a rectangular shape with substantially right-angled edges and a second insertion hole having a circular shape.

13. A television comprising:
an image receiving unit configured to receive an image signal;
an image processing unit configured to process the received image signal;
a display panel configured to display the processed image signal;
a backlight unit configured to illuminate the display panel;
a power supply configured to supply power to at least one of the image receiving unit, the image processing unit and the backlight unit, the power supply comprising:
a circuit board;
a rectifier configured to rectify input AC power and mounted on or mounted through a surface of the circuit board;
a converter configured to convert the rectified AC power into DC power through a switching control and mounted on or mounted through the surface of the circuit board;
an input connector configured to receive the AC power and is mounted on the circuit board such that a projecting height of the input connector projecting from the circuit board is smaller than each of a projecting height of the rectifier and a projecting height of the converter, the rectifier and the converter projecting from the circuit board; and
an output connector coupled to the input connector of the power supply and configured to input the AC power to the power supply.

14. The television according to claim 13, further comprising:
a front cover which covers a front side of the television such that the display panel is exposed; and
a rear cover which covers a rear side of the television, accommodates the image receiving unit, the image processing unit, the backlight unit and the power supply, and includes a depressed portion depressed toward the front cover.

15. The television according to claim 14, wherein the rear cover includes a cover insertion hole formed at one side of the depressed portion, and the power supply is accommodated in the rear cover in such a manner that the input connector is coupled to the output connector through the cover insertion hole.

16. The television according to claim 13, wherein the input connector is mounted to the circuit board along a direction substantially perpendicular to the circuit board.

17. The television according to claim 13, wherein the input connector comprises at least one input terminal configured to receive the AC power from the output connector, each of the at least one input terminal having one end portion which is accommodated in the input connector and another end portion which is mounted on the circuit board.

18. The television according to claim 17, wherein the input connector further comprises a shield configured to prevent the input terminal from being exposed in a direction away from the circuit board.

19. The television according to claim 17, wherein the input connector further comprises a coupling pin projecting toward the circuit board and coupling the input connector to the circuit board.

20. The television according to claim 13, wherein the circuit board further includes an element accommodating hole configured to accommodate at least one of electronic elements constituting the rectifier and the converter.

21. The television according to claim 13, wherein the input connector comprises a hook which is hooked to a hoop of the connector accommodating hole of the circuit board.

22. The television according to claim 13, wherein the input connector comprises arms extending in a plane direction of the circuit board.

23. The television according to claim 22, wherein the arms are respectively provided at both sides of the input connector with the connector accommodating hole interposed between the arms.

24. The television according to claim 22, wherein the input connector further comprises:
a fastening hole which is formed in at least one of the arms to fasten the input connector to the circuit board by a fastener; and
a coupling pin which is provided in at least one of the arms, projects toward the circuit board, and is coupled to the circuit board by welding.

25. The television as claimed in claim 13, wherein a projecting height of the output connector from the circuit board while coupled to the input connector is substantially equal to or smaller than the projecting height of at least one of the rectifier and the converter from the circuit board.

26. A power supply for a television, the power supply comprising:
a circuit board on which at least two electronic elements receiving input AC power is mounted, the at least two electronic elements mounted on or mounted through a surface of the circuit board; and
an input connector configured to receive the AC power from an external source and is mounted on the circuit board such that a projecting height of the input connector projecting from the circuit board is smaller than a projecting height of each of the at least two electronic elements projecting from the surface of the circuit board.

27. The power supply according to claim 26, wherein:
the input connector comprises at least one input terminal configured to receive the AC power through a connection to at least one corresponding output terminal of a detachable output connector coupled to the input connector to provide the AC power; and
the input connector accommodates the output connector therein through at least one insertion hole thereof.

28. The power supply according to claim 26, wherein the at least two electronic elements from the circuit board comprises at least a rectifier and a converter.

29. The power supply according to claim 1, wherein the input connector height comprises a distance between a top surface of the casing of the input connector and a bottom surface of the casing of the input connector.

30. The television according to claim 13, wherein the input connector height comprises a distance between a top surface of the casing of the input connector and a bottom surface of the casing of the input connector.

31. The power supply according to claim 26, wherein the input connector height comprises a distance between a top surface of the casing of the input connector and a bottom surface of the casing of the input connector.

* * * * *